United States Patent
De Waele et al.

(10) Patent No.: US 8,358,301 B2
(45) Date of Patent: Jan. 22, 2013

(54) VIDEO DEPTH MAP ALIGNMENT

(75) Inventors: Stijn De Waele, Eindhoven (NL); Philip Steven Newton, Eindhoven (NL); Hong Li, Eindhoven (NL); Mauro Barbieri, Eindhoven (NL); Johannes Weda, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 937 days.

(21) Appl. No.: 12/447,525

(22) PCT Filed: Oct. 26, 2007

(86) PCT No.: PCT/IB2007/054360
§ 371 (c)(1),
(2), (4) Date: Apr. 28, 2009

(87) PCT Pub. No.: WO2008/053417
PCT Pub. Date: May 8, 2008

(65) Prior Publication Data
US 2010/0067864 A1    Mar. 18, 2010

(30) Foreign Application Priority Data

Oct. 30, 2006  (EP) .................................. 06123176

(51) Int. Cl.
*G06T 15/00* (2011.01)

(52) U.S. Cl. ........ 345/418; 345/419; 345/420; 345/629; 345/630; 348/157; 382/103; 382/209

(58) Field of Classification Search .................. 345/418, 345/419, 420, 421, 422, 629, 630; 348/157; 382/103, 209
See application file for complete search history.

(56) References Cited

U.S. PATENT DOCUMENTS

| | | | |
|---|---|---|---|
| 6,377,257 B1 | 4/2002 | Borrel et al. | |
| 6,940,538 B2 * | 9/2005 | Rafey et al. | 348/157 |
| 7,974,443 B2 * | 7/2011 | Kipman et al. | 382/103 |
| 8,077,981 B2 * | 12/2011 | Elangovan et al. | 382/209 |
| 2003/0043270 A1 | 3/2003 | Rafey et al. | |

FOREIGN PATENT DOCUMENTS

WO    2005114998 A1    12/2005

* cited by examiner

*Primary Examiner* — Phu K Nguyen

(57) ABSTRACT

A system (1) for producing a depth map of a video sequence comprises a client (C) and a server (S) connected by a network (N). A secondary video sequence (M*) available at the client (C) is derived from a primary video sequence (M) available at the server (S), the primary video sequence (M) having a primary depth map (D). The server comprises a transmission unit for transmitting the primary depth map (D) to the client. The client comprises an alignment unit for aligning the primary depth map (D) with the secondary video sequence (M*) so as to produce alignment information (AI), and a derivation unit for deriving the secondary depth map (D*) from the primary depth map (D) using the alignment information (AI).

17 Claims, 4 Drawing Sheets

VIDEO DEPTH MAP ALIGNMENT

BACKGROUND OF THE INVENTION

The present invention relates to video depth map alignment. More in particular, the present invention relates to a method of and a system for producing a depth map of a secondary video sequence derived from a primary video sequence by editing or other processing.

It is well known to produce a depth map of a video sequence, such as a motion picture or any other sequence of images, the depth map providing depth information allowing two-dimensional (2D) images to be converted into three-dimensional (3D) images.

U.S. Pat. No. 6,377,257 (IBM), for example, discloses a system for generating and delivering images of synthetic content, consisting of three-dimensional geometric models, across a computer network. The system uses a server computer and a client computer, and a video stream may contain a time-dependent depth map for server-rendered objects. A video sequence is sent from the server to the client for local rendering, the depth map is not transmitted if the client has no 3D capabilities.

In some applications a video sequence may already be available at the client, and a depth map may be added later. This may be the case when a user has a recorded version of a two-dimensional motion picture and wants to add depth to obtain a three-dimensional motion picture. The recorded version of the motion picture may for example be stored on a DVD (Digital Versatile Disk), on a hard-disk recorder or on the hard disk of a computer system. It would be possible to obtain a depth map associated with the motion picture from a (remote) server. However, the recorded version is typically not identical to the original version. The recorded version may, for example, be recorded from television. In contrast to the original version, the television version of the motion picture may contain commercials, while certain violent scenes may have been omitted. In addition, the recording time may not coincide exactly with the duration of the television broadcast, and the user may have edited her version. For these reasons, the depth map available from the server will typically not match the recorded video sequence, resulting in undesired depth mismatches.

It is, of course, possible to obtain the original version of the video sequence (that is, the version matching the depth map) from the server and align the primary (original) and secondary (modified) video sequences so as to obtain the correct alignment for the depth map. However, transmitting either the original or the modified video sequence requires a relatively large bandwidth while duplicating a substantial amount of information, as most of the original video sequence at the server will be identical to the modified (e.g. edited) video sequence at the client.

SUMMARY OF THE INVENTION

It is an object of the present invention to overcome these and other problems of the Prior Art and to provide a method and system for producing a depth map of a secondary video sequence, which secondary video sequence is derived from an original or primary video sequence, which method and system avoid the transmission of either the primary or the secondary video sequence while providing an excellent match between the depth map and the secondary video sequence.

Accordingly, the present invention provides a method of producing a secondary depth map of a secondary video sequence, wherein the secondary video sequence is derived from a primary video sequence having a primary depth map, wherein the secondary video sequence is available at a client and wherein the primary depth map is available at a server, which client and server are connected by a network, the method comprising the steps of:
 transmitting the primary depth map from the server to the client,
 aligning, at the client, the primary depth map with the secondary video sequence so as to produce alignment information, and
 deriving, at the client, the secondary depth map from the primary depth map using the alignment information.

By aligning the primary depth map with the secondary video sequence at the client to produce alignment information and deriving a secondary depth map on the basis of the primary depth map and said alignment information, a secondary depth map is obtained without transmitting the primary video sequence. The secondary depth map will typically be perfectly aligned with the secondary video sequence, thus fully complementing the secondary video sequence without introducing any artifacts. By only transmitting the primary depth map (plus any optional additional data not including the primary video sequence), a substantial bandwidth saving is obtained.

The alignment of the primary depth map with the secondary video sequence involves matching images of the depth map with images of the video sequence so as to produce alignment information indicative of the correspondence of the respective images. The correspondence can be determined by using similarity measures, such as cross-correlation, applied to individual images, or to features of those images. The alignment information could, for example, indicate which image of the (primary) depth map corresponds with an image of the (secondary) video sequence, for example by listing the relevant image numbers. Instead of image numbers, other indicators or markers may be used, such as time durations from a certain point, time stamps, etc.

The step of deriving the secondary depth map from the primary depth map using the alignment information may for example involve using any image numbers or other indicators contained in the alignment information to select corresponding sections from the primary depth map and compile the selected sections into a secondary depth map which corresponds with the secondary video sequence.

The step of aligning, at the client, the primary depth map with the secondary video sequence may involve:
 extracting features from the secondary video sequence,
 extracting features from the primary depth map, and
 matching the extracted features.

By extracting features from both the secondary video sequence and the primary depth map, a relatively simple alignment can be achieved. The extracted features may comprise shot cuts (that is, scene changes), color and/or brightness statistics (such as luminance histograms), edge maps, etc. The matching step may involve similarity measures such as cross-correlations, distances, etc.

In an alternative embodiment, the step of aligning the primary depth map with the secondary video sequence may involve:
 deriving a preliminary secondary depth map from the secondary video sequence, and
 matching the preliminary secondary depth map and the primary depth map.

In this embodiment, a preliminary secondary depth map is derived, at the client, from the secondary video sequence using techniques which may be known per se. This preliminary secondary depth map is then matched with the primary depth map received from the server. The matching step may be preceded by feature extraction steps. This embodiment involves a reduced amount of data in the alignment step, as depth maps typically contain less information than the video sequence from which they are derived.

In the above-mentioned embodiments, the alignment takes place at the client. However, the invention is not so limited and in alternative embodiments, the alignment takes place at the server. Accordingly, the present invention also provides a method of producing a secondary depth map of a secondary video sequence, wherein the secondary video sequence is derived from a primary video sequence having a primary depth map, wherein the secondary video sequence is available at a client and wherein the primary video sequence and the primary depth map are available at a server, which client and server are connected by a network, the method comprising the steps of:

extracting, at the server, primary features from the primary video sequence, extracting, at the client, secondary features from the secondary video sequence, transmitting the secondary features from the client to the server, aligning, at the server, the primary features with the secondary features so as to produce alignment information, deriving, at the server, the secondary depth map from the primary depth map using the alignment information, and transmitting the secondary depth map from the server to the client.

By extracting features from the secondary video sequence at the client, it is possible to carry out the alignment at the server without transmitting the secondary video sequence. Instead, the extracted features are transmitted, resulting in a low bandwidth requirement relative to transmitting the secondary video sequence itself. The feature extraction, alignment and derivation of the secondary depth map may be identical to their counterparts of the first embodiment, in which these steps are carried out at the client. Carrying out these steps at the server has the advantage that the server typically has more processing power than the client, resulting in a faster execution of the method steps.

It will be understood that both this second embodiment and the first embodiment discussed above have the advantage of transmitting neither the primary video sequence nor the secondary video sequence, thus saving bandwidth.

In a third embodiment, the step of extracting at the server involves extracting features from the primary depth map instead of from the primary video sequence. In this embodiment, therefore, the primary features are based upon the primary depth map and are compared with the secondary features extracted from the secondary video sequence. This third embodiment has the advantage that less processing power is required, as a depth map typically contains less information than the corresponding video sequence.

The present invention also provides a method of and a system for detecting commercials or other added scenes in a video sequence. Instead of, or in addition to producing a secondary depth map, the alignment information can be used to indicate which parts of the secondary video sequence are not present in the original, primary video sequence.

The present invention also provides a computer program product for carrying out the methods defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention additionally provides a system for producing a secondary depth map of a secondary video sequence, wherein the secondary video sequence is derived from an primary video sequence having a primary depth map, wherein the secondary video sequence is available at a client and wherein the primary depth map is available at a server, which client and server are connected by a network, in which system the server comprises:

a transmission unit for transmitting the primary depth map to the client, and the client comprises:

an alignment unit for aligning the primary depth map with the secondary video sequence so as to produce alignment information, and a derivation unit for deriving the secondary depth map from the primary depth map using the alignment information.

This system has the same advantages as the corresponding method.

In a second embodiment of the system according to the present invention, the client comprises a client extraction unit for extracting secondary features from the secondary video sequence and a client transmission unit for transmitting the extracted secondary features to the server, while the server comprises a server extraction unit for extracting features from the primary video sequence and an alignment unit is located at the server so as to produce the secondary depth map at the server. In this second embodiment, the server transmission unit transmits the secondary depth map to the client, instead of the primary depth map.

In a third embodiment of the system according to the present invention, the server extraction unit extracts features from the primary depth map, instead of from the primary video sequence.

The system of the present invention may also be used as a commercial detector system for detecting commercials or other added scenes or images in a video sequence.

The present invention further provides a client unit and a server unit for use in the system defined above. The client unit may comprise a computer system, a digital television apparatus, a hard-disk recorder, or any other suitable device. The server unit may comprise a dedicated or generic computer system provided with suitable software programs for carrying out the method steps of the present invention.

BRIEF DESCRIPTION OF THE DRAWINGS

The present invention will further be explained below with reference to exemplary embodiments illustrated in the accompanying drawings, in which.

DETAILED DESCRIPTION OF PREFERRED EMBODIMENTS

Figure 1:
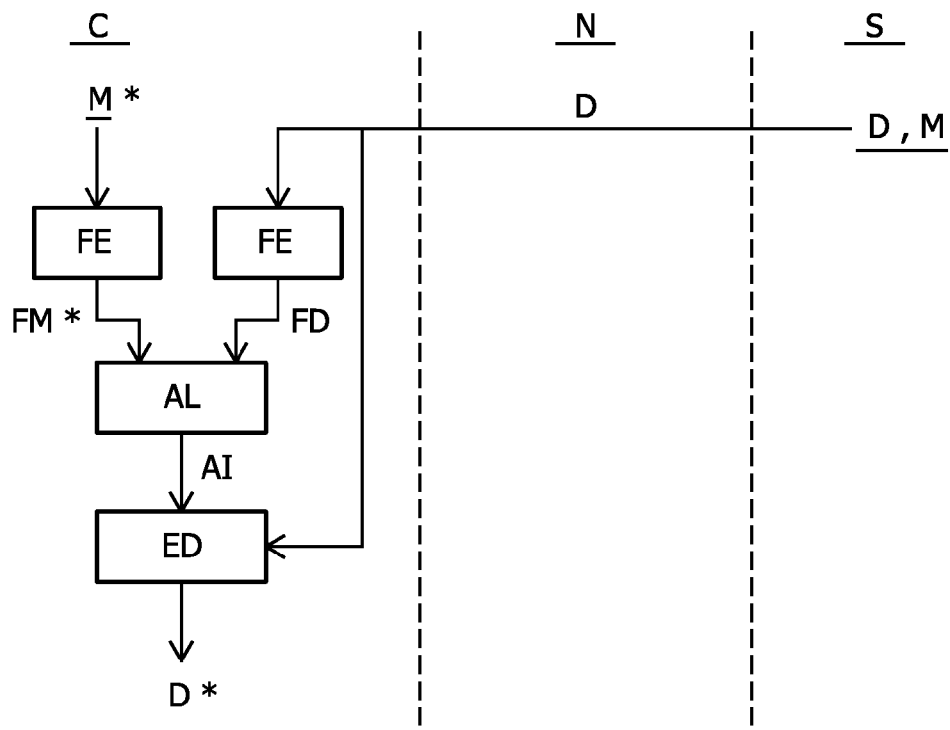
FIG. 1 schematically shows a first embodiment of the method of the present invention.
Figure 5:
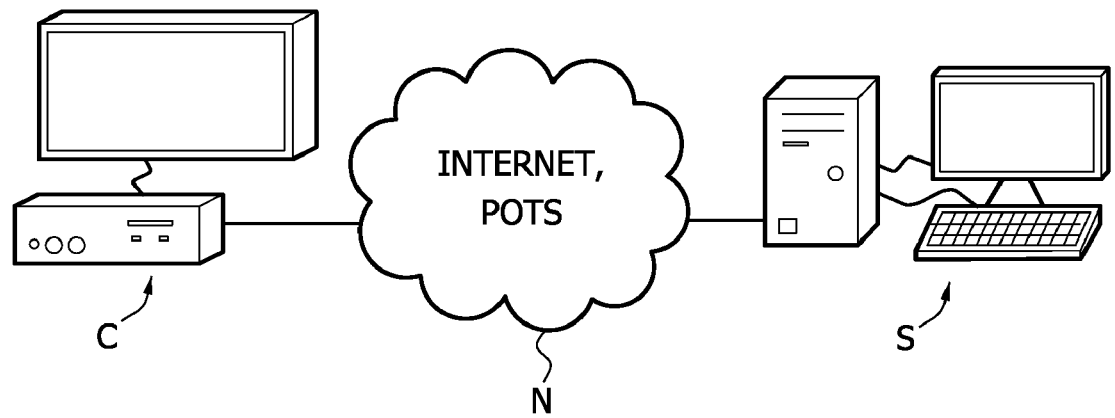
FIG. 5 schematically shows a video distribution system according to the present invention.

The inventive method shown merely by way of non-limiting example in FIG. 1 involves a client C and a server S which are connected, or connectable, by means of a network N. As illustrated in FIG. 5, the client C may comprise a hard-disk recorder and a television apparatus, and/or equivalent apparatus such as a computer system, while the server S may comprise a dedicated computer system or a general purpose computer system running suitable software programs. The network N may comprise the Internet, a POTS (Plain Old Telephone Service) network, an ISDN network, a LAN (Local Area Network), a direct cable connection, and/or any other suitable link between the server S and the client C.

At the server S an original or primary video sequence M is available. This primary video sequence, which may for example be a motion picture or a video clip, may be stored on a hard disk or other storage device of the server itself, or at a storage device external but connectable to the server S. An original or primary depth map D, corresponding with the primary video sequence M, is also available at the server. This depth map D contains information which allows a suitable video rendering device to produce a three-dimensional rendering of the video sequence M. In other words, the depth map D contains additional depth information. This depth information may be provided for each video sequence image separately, but is typically provided for each set of images (e.g. a set of 5, 10 or 20 consecutive images of the sequence) to reduce the required amount of data, the video rendering device at the client C being capable of interpolating and/or extrapolating the depth information so as to produce depth information for each individual image of the video sequence.

Figure 6:
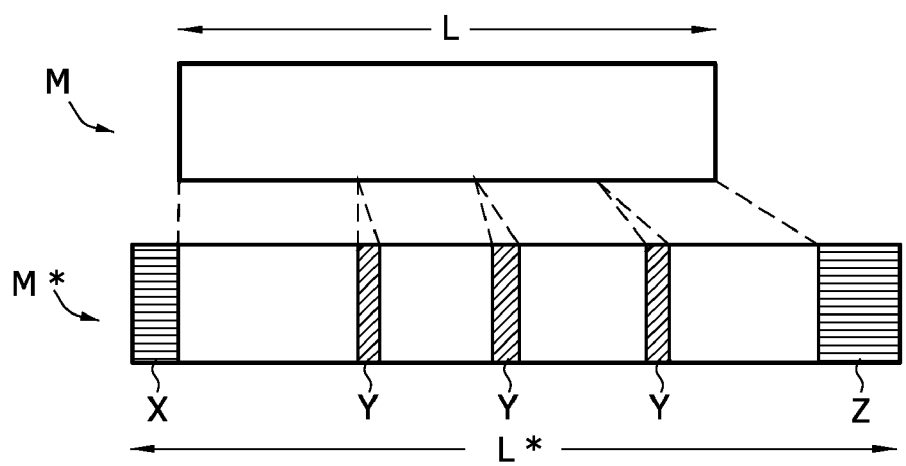
FIG. 6 schematically shows the discrepancy between original and recorded video sequences as is mitigated by the present invention.

The client C stores an amended version M* of a video sequence. The amended or secondary video sequence M* may be derived from the primary video sequence M by editing, copying while introducing errors, etc. This is illustrated in FIG. 6, where the original (primary) video sequence M, stored at the server S in the system of FIG. 5, is shown to have a length L. This original video sequence M may include explicit scenes which are not broadcast or which may have been omitted from a rental or download version. The secondary video sequence M* may have been obtained by recording a broadcast, copying a DVD (Digital Versatile Disk) or downloading from the Internet. A broadcast version typically contains commercials Y. When a user records a broadcast video sequence, there may be a discrepancy between the recording start time and the broadcast start time, resulting in added duration X and Z before and after the actual video sequence respectively. As a result, the amended (secondary) video sequence M* has a length L* which is larger than the original length L. Even if the commercials Y and the added sections X and Z are removed, a discrepancy between the original video sequence M and the recorded video sequence M* will remain. This discrepancy may be worsened by any loss of quality, for example by recording from an analog source (analog television or VHS video tape). As a result, the original depth map D will not match the recorded video sequence M*, which may lead to image distortion and undesired artifacts.

To solve this problem, it is of course possible to (re)transmit the original video sequence M from the server to the client. However, this requires a substantial amount of bandwidth (that is, data transmission capacity) and leads to a duplication of video data. In addition, it may not be possible for the client to store an exact copy of the original video sequence, for example when the client uses an analog video recorder.

Figure 3:
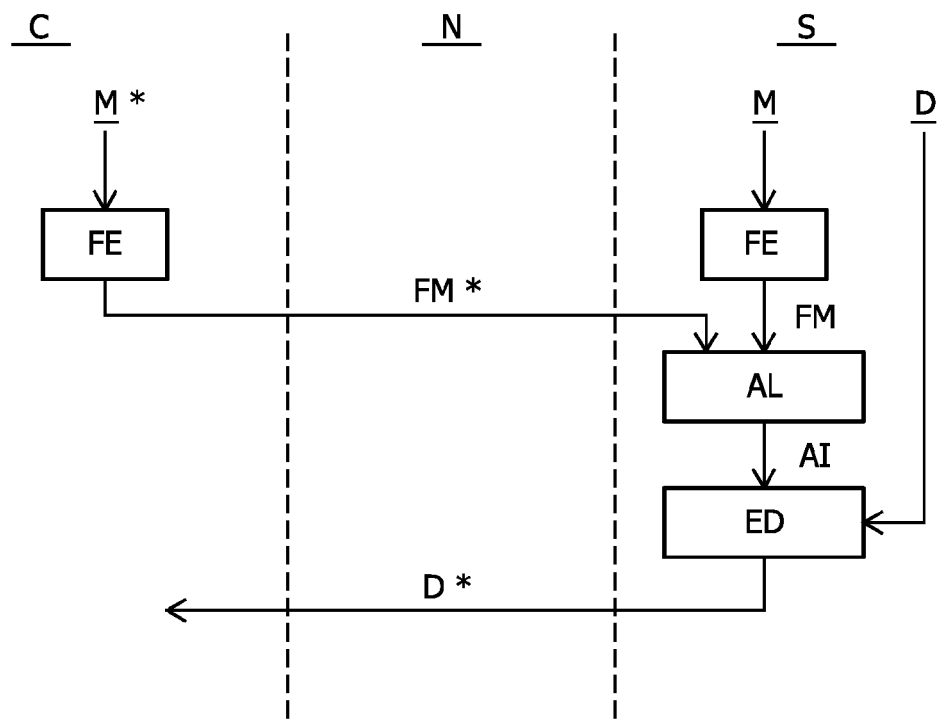
FIG. 3 schematically shows a third embodiment of the method of the present invention.
Figure 4:
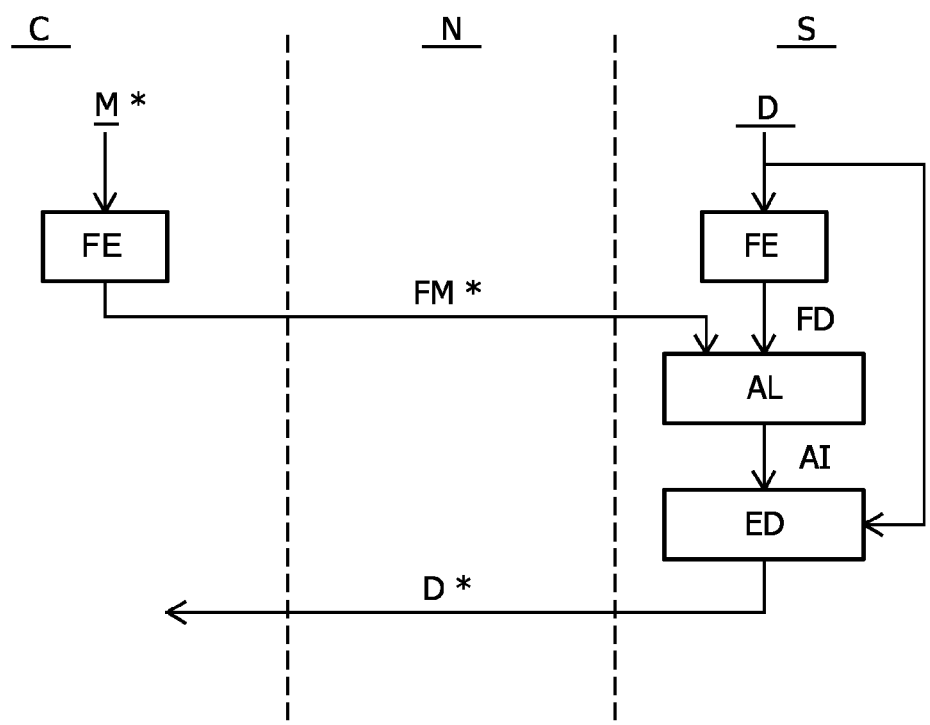
FIG. 4 schematically shows a fourth embodiment of the method of the present invention.

In accordance with the present invention, the original video sequence M is not transmitted or retransmitted. Instead, the original (primary) depth map D is transmitted to produce an amended (secondary) depth map D* at the client (FIGS. 1 & 2), or features of the amended (secondary) video sequence M* are transmitted to produce the amended (secondary) depth map D* at the server (FIGS. 3 & 4). It will be understood that a depth map typically contains significantly less information than the corresponding video sequence, so transmitting a depth map instead of the video sequence results in a substantial bandwidth reduction. Similarly, features of a video sequence also typically contain significantly less information than the video sequence itself, and also in this case a substantial bandwidth reduction may be achieved.

In FIG. 1, the method steps of a first embodiment of the present invention are schematically illustrated. At the server S a primary video sequence M and the associated depth map D are available, while a secondary video sequence M* is available at the client C. It is noted that the availability of the primary video sequence M at the server and at the time of carrying out the present invention is not essential.

In accordance with the present invention, the primary depth map D is transmitted from the server S via the network N to the client C, to derive a secondary depth map D* at the client, while the original video sequence M is not transmitted (it is noted that the original video sequence M may be transmitted at an earlier stage, resulting in the amended video sequence M*; the present invention applies in particular to the situation in which the secondary video sequence M* is available at the client). As mentioned above, the network N may be constituted by a single cable but will typically be constituted by the Internet and/or a telephone network.

At the client C, the secondary video sequence M* is aligned (step AL) with the primary depth map D to produce alignment information AI indicative of the alignment (or "matching") of the sequence M* and the map D. The alignment information AI is then used to adjust or "edit" (step ED) the primary depth map D so as to derive the secondary, adjusted depth map D* with corresponds with the client's secondary video sequence M*. The secondary depth map D* and the secondary video sequence M* can be fed to a rendering device suitable for three-dimensional viewing, such as a 3D television set.

The alignment (step AL) of the primary depth map D and the secondary video sequence M* is in the embodiment of FIG. 1 preceded by optional feature extraction (FE) steps which produce primary depth map features FD and secondary video sequence features FM* respectively. The prior extraction of features facilitates the alignment by reducing the amount of data involved.

Various features may be extracted and used for the alignment, either separately or in combination. A very suitable feature is shot cuts (that is, scene changes) as shot cuts detection methods are well known. Other features include color (including color statistics), brightness (including luminance histograms), edge maps, peaks and/or valleys, etc. If the video sequence is accompanied by an audio sequence, audio features can also be used, for example silent periods. In principle any feature can be used that allows the correspondence of (set of) images of the primary depth map D and the secondary video sequence M* to be determined. The alignment (AL) step may comprise the known technique of approximate string matching. Instead of, or in addition to using features, pixel correlation techniques may be used.

The editing (ED) step involves both the alignment information AI and the primary depth map D so as to derive the secondary depth map D*. This editing step may involve decoding the selected sections of the depth map D as indicated by the alignment information. These sections are subsequently re-encoded to create the secondary depth map D*.

Figure 2:
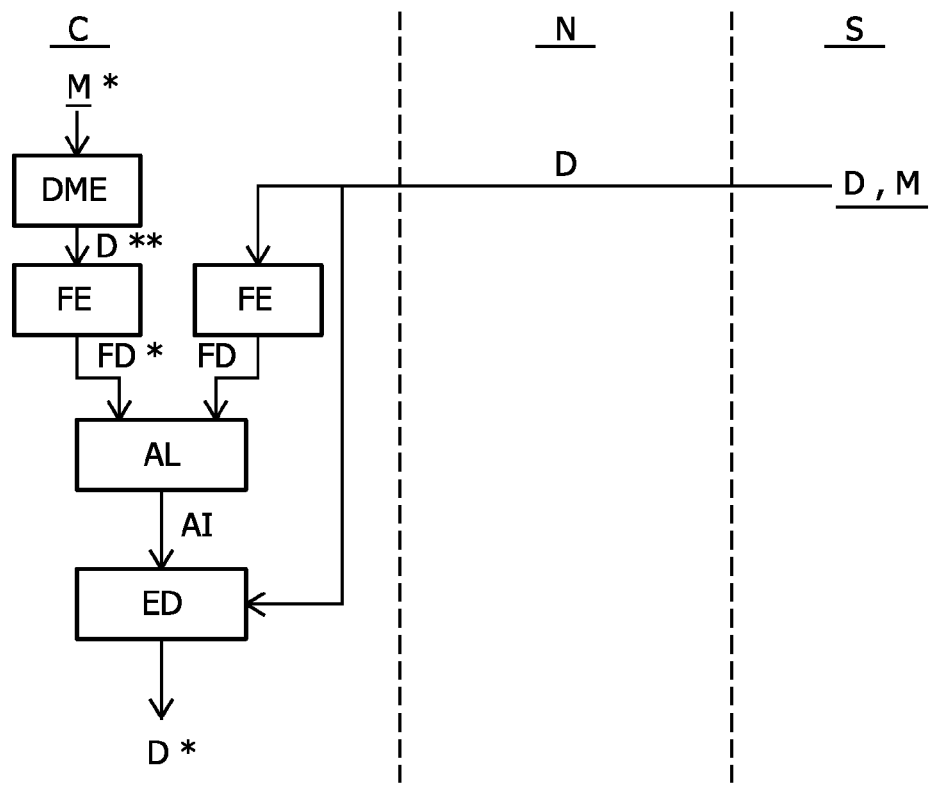
FIG. 2 schematically shows a second embodiment of the method of the present invention.

In the embodiment of FIG. 2, the alignment (AL) step is preceded by a depth map estimation (DME) step which results in a preliminary secondary depth map D**, derived from the secondary video sequence M*. Depth map derivation techniques are known per se. The preliminary secondary depth map D** may be directly aligned with the primary depth map D, or via respective feature extraction (FE) steps as shown in FIG. 2. The extraction of features from a depth map may be identical to the extraction of features from a video sequence.

In addition to the primary depth map D, metadata associated with the primary video sequence M could be transmitted from the server S to the client C. Suitable metadata may comprise time stamps, shot cut indicators, entry points, etc.

In the embodiments of FIGS. 1 and 2, the alignment and the production of the secondary depth map D* is carried out at the client C. In the alternative embodiments of FIGS. 3 and 4, these steps are carried out at the server S.

As shown in FIG. 3, the features FM* of the secondary video sequence M* are first extracted at the client C in a feature extraction (FE) step. This step significantly reduces the amount of data to be transmitted to the server S. At the server, the features FM of the primary video sequence M are also extracted, allowing an alignment (AL) of the features FM and FM*, resulting in alignment information AI. In an editing (ED) step, this alignment information AI is used to "edit" the primary depth map D to produce the secondary depth map D*, which is then transmitted to the client C. It can be seen that these steps closely correspond to the steps of the embodiment of FIG. 1.

The embodiment of FIG. 4 is essentially identical to the embodiment of FIG. 3, with the exception of the feature extraction at the server. Whereas in the embodiment of FIG. 3 the features FE of the primary video sequence M are extracted at the server, in the embodiment of FIG. 4 the features FD of the primary depth map D are extracted (step FE). This removes the need for the primary video sequence M to be present at the server S.

Figure 7:
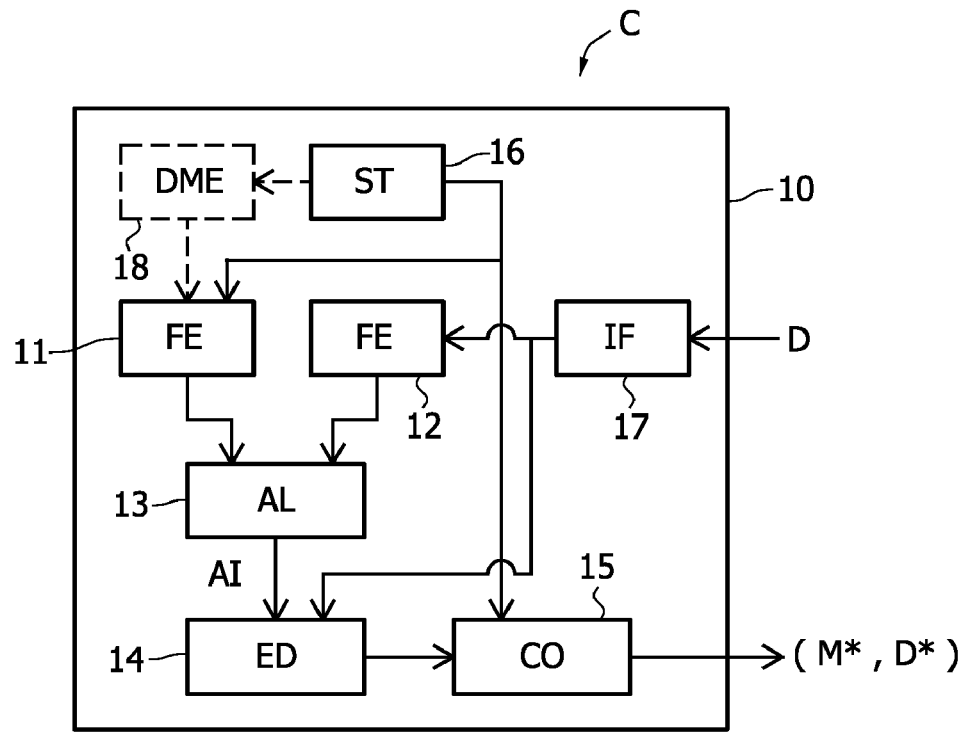
FIG. 7 schematically shows a client unit for use in the method and system according to the present invention.

In FIG. 7 an exemplary embodiment of a client unit 10 is schematically illustrated. In the merely exemplary and non-limiting embodiment of FIG. 7, the client unit 10 comprises a first feature (FE) extraction unit 11, a second feature extraction (FE) unit 12, an alignment (AL) unit 13, an edit (ED) unit 14, a combination (CO) unit 15, a storage (ST) unit 16, an interface (IF) unit 17 and an optional depth map estimation (DME) unit 18. The client unit 10 may comprise further components which are not shown for the sake of clarity of the illustration, such as a transmission unit.

The storage unit 16 stores the secondary video sequence M*, which is fed to the first feature extraction unit 11 either directly or via the optional depth map estimation unit 18. The interface unit 17 receives the primary depth map D from the server (S in FIG. 1) and feeds this depth map D to the second feature extraction unit 12. The extracted features are aligned (that is, matched) in the alignment unit 13, and the resulting alignment information is fed to the edit unit 14, together with the primary depth map D. The secondary depth map D* produced by the edit unit 14 is fed to the combination unit 15, where it is combined with the secondary video sequence and is transmitted to suitable rendering apparatus, such as a 3D television device.

Figure 8:
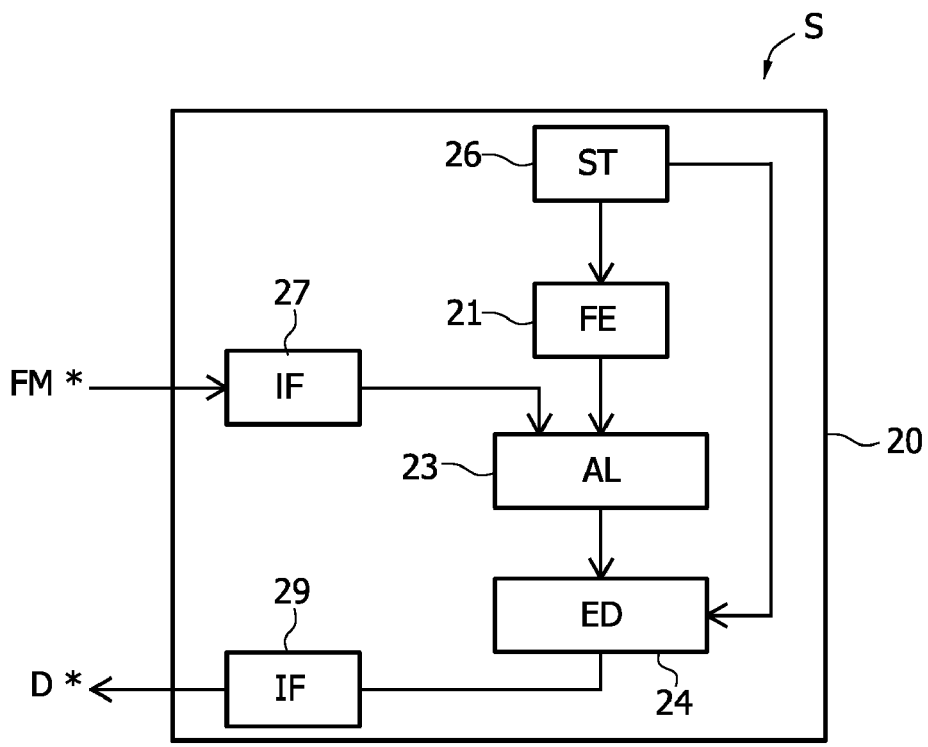
FIG. 8 schematically shows a server unit for use in the method and system according to the present invention.

In FIG. 8 an exemplary embodiment of a server unit 20 is schematically illustrated. In the merely exemplary and non-limiting embodiment of FIG. 8, the server unit 20 comprises a feature extraction (FE) unit 21, an alignment (AL) unit 23, an edit (ED) unit 24, a storage (ST) unit 26, an interface (IF) unit 27, and a transmission (TR) unit 29. The server unit 20 may comprise further components which are not shown for the sake of clarity of the illustration.

The primary depth map D and (optionally) the primary video sequence M are stored in the storage unit 26, which feeds the depth map D to the edit unit 24 and either the depth map D or the primary video sequence M to the feature extraction unit 21. The interface unit 27 receives the features FM* extracted from the secondary video sequence from the client C and passes these features to the alignment unit 23, which also receives the features extracted by the extraction unit 21. The resulting alignment information, as well as the primary depth map, are used by the edit unit 24 to produce the secondary depth map D*, which is transmitted to the client by the transmission unit 29.

The present invention may also be used for commercial detection. As shown in FIG. 6, commercials Y may interrupt the original video sequence M. During these commercials, the primary depth map D will no longer match the secondary video sequence M*. More in particular, no alignment is possible during the commercials. As a result, the alignment information (AI in FIGS. 1-4) is indicative of the presence or absence of commercials and similar interruptions of the (primary) video sequence.

The present invention may be summarized as a method of producing a secondary depth map of a secondary video sequence, wherein the secondary video sequence has previously been derived from a primary video sequence having a primary depth map, wherein the secondary video sequence is available at a client and wherein the primary video sequence and the primary depth map are available at a server, which client and server are connected by a network, the method excluding the step of transmitting a video sequence between the server and the client.

The present invention is based upon the insight that a transmission of a video sequence can be avoided by extracting features from the primary depth map or from the secondary video sequence, and by deriving a secondary depth map from the primary depth map and the extracted features.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of producing a secondary depth map (D*) of a secondary video sequence (M*), wherein the secondary video sequence (M*) is derived from a primary video sequence (M) having a primary depth map (D) which comprises information which allows a suitable video rendering device to produce a three-dimensional rendering of the primary video sequence (M); wherein the secondary video sequence (M*) is available at a client (C) and wherein the primary depth map (D) is available at a server (S), which client and server are connected by a network (N), the method comprising the steps of:

transmitting the primary depth map (D) from the server to the client, aligning, at the client, the primary depth map (D) with the secondary video sequence (M*) so as to produce alignment information (AI), and deriving, at the client, the secondary depth map (D*) from the primary depth map (D) using the alignment information (AI), wherein said secondary depth map (D*) comprises information which allows a suitable video rendering device to produce a three-dimensional rendering of the secondary video sequence (M*).

2. The method according to claim 1, wherein the step of aligning involves:
extracting features from the secondary video sequence (M*),
extracting features from the primary depth map (D), and
matching the extracted features.

3. The method according to claim 2, wherein the extracted features comprise shot cuts, edge maps, color statistics and/or brightness statistics.

4. The method according to claim 3, wherein the step of extracting at the server involves extracting features from the primary depth map (D) instead of from the primary video sequence (M).

5. The method according to claim 1, wherein the step of aligning involves:
deriving a preliminary secondary depth map (D**) from the secondary video sequence, and
matching the preliminary secondary depth map (D**) and the primary depth map (D).

6. The method according to claim 1, wherein the primary video sequence (M) is also available at the server (S).

7. The method according to claim 1, wherein the step of aligning additionally involves metadata transmitted from the server (S) to the client (C).

8. A non-transitory computer storage medium, the content of which comprising a computer program for carrying out the method according to claim 1.

9. A method of producing a secondary depth map (D*) of a secondary video sequence (M*), wherein the secondary video sequence (M*) is derived from a primary video sequence (M) having a primary depth map (D) which comprises information which allows a suitable video rendering device to produce a three-dimensional rendering of the primary video sequence (M); wherein the secondary video sequence (M*) is available at a client (C) and wherein the primary video sequence (M) and the primary depth map (D) are available at a server (S), which client and server are connected by a network (N), the method comprising the steps of:
extracting, at the server, primary features (F) from the primary video sequence (M),
extracting, at the client, secondary features (F*) from the secondary video sequence (M*),
transmitting the secondary features (F*) from the client to the server,
aligning, at the server, the primary features (F) with the secondary features (F*) so as to produce alignment information (AI),
deriving, at the server, the secondary depth map (D*) from the primary depth map (D) using the alignment information (AI), wherein said secondary depth map (D*) comprises information which allows a suitable video rendering device to produce a three-dimensional rendering of the secondary video sequence (M*), and
transmitting the secondary depth map (D*) from the server to the client.

10. A system (1) for producing a secondary depth map (D*) of a secondary video sequence (M*), wherein the secondary video sequence (M*) is derived from an primary video sequence (M) having a primary depth map (D) which comprises information which allows a suitable video rendering device to produce a three-dimensional rendering of the primary video sequence (M); wherein the secondary video sequence (M*) is available at a client (C) and wherein the primary depth map (D) is available at a server (S), which client and server are connected by a network (N) and comprise a client unit and a server unit respectively, the server unit (20) comprising:
a transmission unit (29) for transmitting the primary depth map (D) to the client;
and the client unit (10) comprising:
an alignment unit (13) for aligning the primary depth map (D) with the secondary video sequence (M*) so as to produce alignment information (AI), and
a derivation unit (14) for deriving the secondary depth map (D*) from the primary depth map (D) using the alignment information (AI), wherein said secondary depth map (D*) comprises information which allows a suitable video rendering device to produce a three-dimensional rendering of the secondary video sequence (M*).

11. The system according to claim 10, wherein the client unit (10) comprises:
a first extraction unit (11) for extracting features from the secondary video sequence (M*),
a second extraction unit (12) for extracting features from the primary depth map (D), and
an alignment unit 4) for aligning the extracted features.

12. The system according to claim 11, wherein the extracted features comprise shot cuts, edge maps, color statistics and/or brightness statistics.

13. The system according to claim 10, wherein the client unit (10) comprises:
a further derivation unit (18) for deriving a preliminary secondary depth map (D**) from the secondary video sequence, and
an alignment unit (13) for aligning the preliminary secondary depth map (D**) and the primary depth map (D).

14. The system according to claim 13, further comprising:
a first extraction unit (11) for extracting features from the preliminary secondary depth map (D**),
a second extraction unit (12) for extracting features from the primary depth map (D).

15. A client unit (10) for use in the system according to claim 10.

16. A server unit (20) for use in the system according to claim 10.

17. A system (1) for producing a secondary depth map (D*) of a secondary video sequence (M*), wherein the secondary video sequence (M*) is derived from an primary video sequence (M) having a primary depth map (D) which comprises information which allows a suitable video rendering device to produce a three-dimensional rendering of the primary video sequence (M); wherein the secondary video sequence (M*) is available at a client (C) and wherein the primary video sequence (M) and the primary depth map (D) are available at a server (S), which client and server are connected by a network (N), in which system the client comprises:
a client extraction unit (11) for extracting secondary features (F*) from the secondary video sequence (M*),
a client transmission unit (15) for transmitting the secondary features (F*) to the server, and wherein the server comprises:
- a server extraction unit (21) for extracting primary features (F) from the primary video sequence (M),
- an alignment unit (23) for aligning the primary features (F) with the secondary features (F*) so as to produce alignment information (AI),
- a derivation unit (24) for deriving the secondary depth map (D*) from the primary depth map (D) using the alignment information (AI), wherein said secondary depth map (D*) comprises information which allows a suitable video rendering device to produce a three-dimensional rendering of the secondary video sequence (M*), and
- a server transmission unit (29) for transmitting the secondary depth map (D*) to the client.

* * * * *